June 27, 1961 B. M. HYMAN ET AL 2,989,832
COUNTER-BALANCED DOUBLE SICKLE BAR FOR MOWERS
Filed March 10, 1959 2 Sheets-Sheet 1
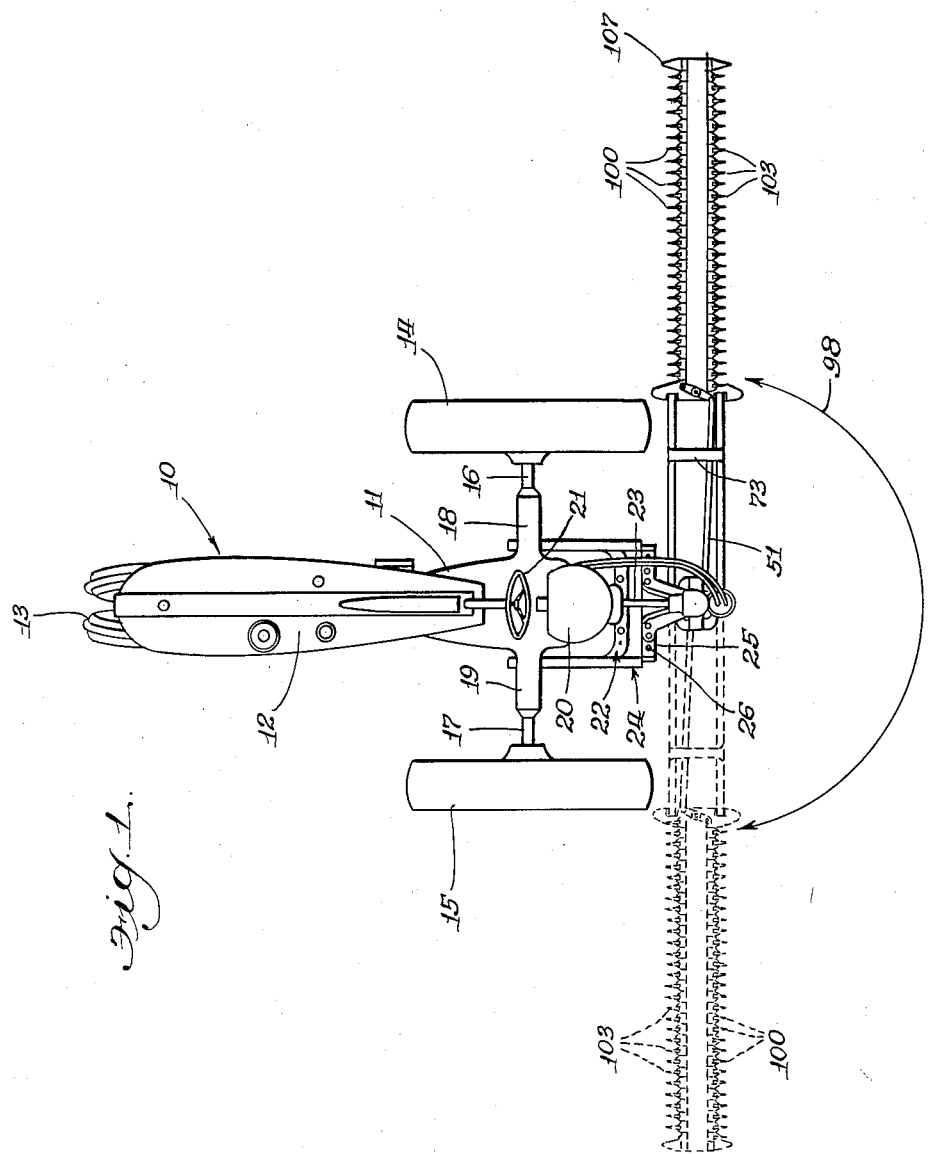
INVENTORS.
Benjamin M. Hyman
Elof K. Karlsson
Paul O. Pipper Atty.

June 27, 1961  B. M. HYMAN ET AL  2,989,832
COUNTER-BALANCED DOUBLE SICKLE BAR FOR MOWERS
Filed March 10, 1959  2 Sheets-Sheet 2
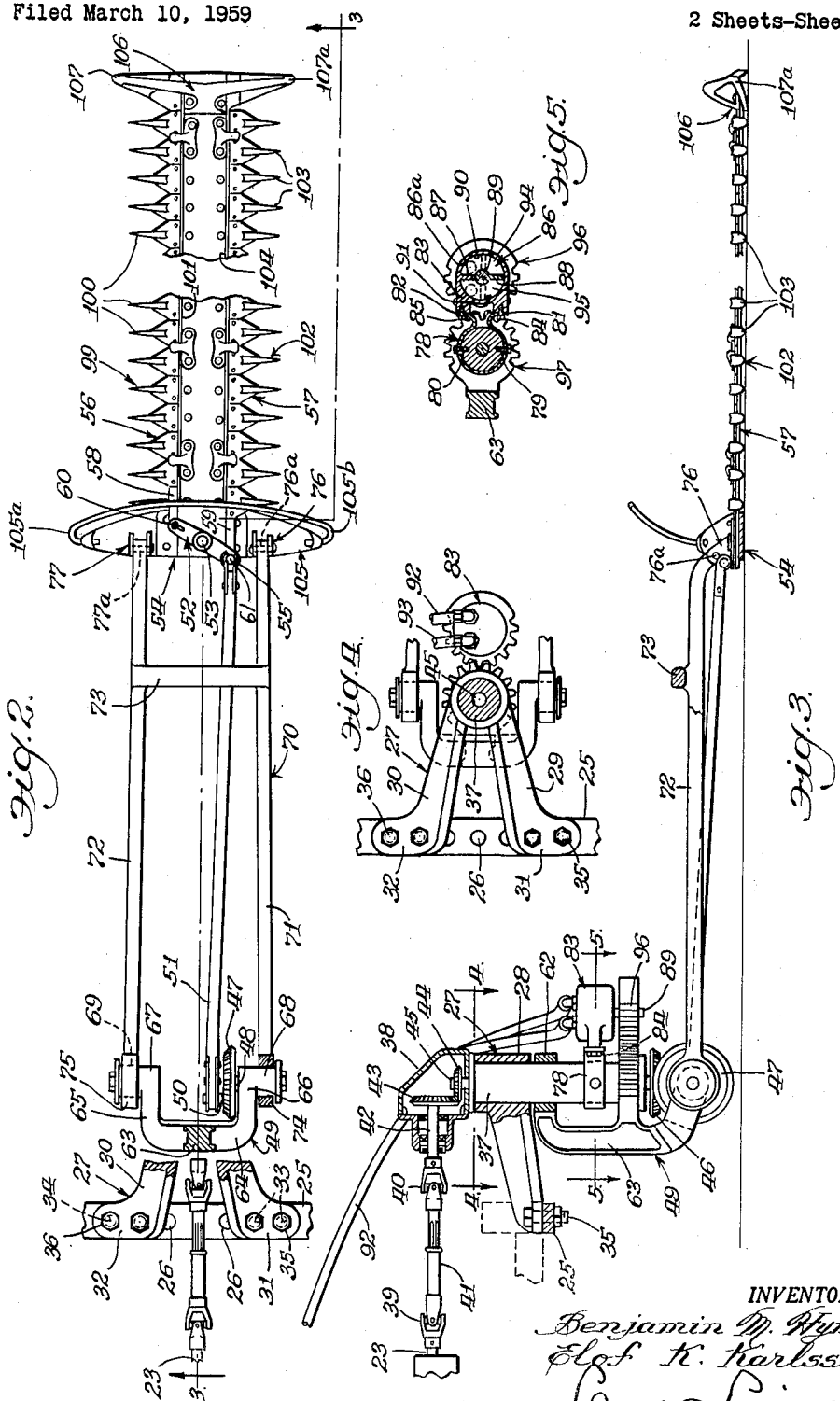
INVENTORS
Benjamin M. Hyman
Elof K. Karlsson

United States Patent Office 2,989,832
Patented June 27, 1961

2,989,832
COUNTER-BALANCED DOUBLE SICKLE BAR FOR MOWERS
Benjamin M. Hyman, East Moline, and Elof K. Karlsson, Moline, Ill., assignors to International Harvester Company, Chicago, Ill., a corporation of New Jersey
Filed Mar. 10, 1959, Ser. No. 798,378
10 Claims. (Cl. 56—25)

This invention relates to a new and improved counter-balanced double sickle bar for mowers.

There has been much engineering and development work among farm implement engineers in an attempt to improve mowers and particularly tractor mounted mowers. The sickle bar mower performs many functions on the farm and an important phase of mowing is now highway mowing wherein the shoulders of the important highways must have the grass and weeds cut down to facilitate better driving conditions. Versatility of the mowers then becomes an added factor in their construction to enable ready cutting on either side of the highway in either direction of travel of the tractor. Further it is desirable to have mowers which will permit cutting close to farm fences or the like in either direction of the tractor and thus avoid unnecessary unproductive travel of the tractor.

It is a principal object of this invention to provide a mower which will cut simultaneously in both forward and rearward directions of movement of the mower.

An important object of this invention is the provision of a sickle bar for a mower having an oscillating cutter at the forward edge of the sickle bar and an oscillating cutter at the rearward edge of the sickle bar.

Another important object of this invention is to employ a single drive mechanism for a two-edged sickle bar mower to simultaneously move the cutting knives in opposite directions and thereupon produce a balanced drive.

Still another important object of this invention is to equip a mower with mounting mechanism wherein the mower bar may be swung through an angle of 180 degrees to enable it to be operated on either side of a carrying tractor.

Another and still further important object of this invention is to provide a fore and aft edged sickle bar mounted for operation on a carrying tractor and having swingable mounting means wherein the two-edged mower bar may extend to either one side of the tractor or the other as desired.

Another important object of this invention is to utilize a double yoke frame structure for mowers wherein the yokes provide for attachment of the mower to a tractor and provide pivot means for movement of the mower in both vertical and horizontal planes.

Still another important object of this invention is the provision of a combination hydraulic and gear mechanism for effecting swinging of the mower through a horizontal plane from one side of the carrying tractor to the other.

Other and further important objects and advantages will become apparent from the disclosures in the following specification and accompanying drawings.

In the drawings:

FIGURE 1 is a top plan view of the tractor mounted mower of this invention;

FIGURE 2 is an enlarged fragmentary plan view with parts broken away and shown in section of the mower and tractor mounting portion of the device as shown in FIGURE 1;

FIGURE 3 is a sectional view taken on the line 3—3 of FIGURE 2 and showing parts thereof in elevation;

FIGURE 4 is a sectional view taken on the line 4—4 of FIGURE 3; and

FIGURE 5 is a sectional view taken on the line 5—5 of FIGURE 3.

As shown in the drawings, the reference numeral 10 indicates generally an agricultural type tractor having a generally narrow, longitudinally extending frame or chassis 11 with a narrow elongated engine 12 mounted over the forward end thereof. The forward end of the chassis 11 is carried on dirigible wheels 13 and the rearward end of the tractor chassis 11 is supported by widely spaced apart large traction wheels 14 and 15. The wheels 14 and 15 are mounted on axles 16 and 17 which in turn are carried in housing members 18 and 19 which are unitarily formed with the differential carrying rearward end of the chassis 11. The tractor 10 is further supplied with an operator's seat 20, a steering wheel 21 and other tractor control members (not shown) to facilitate operation of the tractor by the operator when he is located in the seat 20. A drawbar 22 is mounted onto the rear of the tractor chassis 11 and facilitates the attachment of implements to the rear of the tractor. A power take-off shaft 23 projects out the rear of the tractor above the drawbar 22 and is utilized to drive the mower elements. The drawbar 22 is provided with a superposed drawbar frame structure 24 carried thereon for the purpose of receiving the mower of this invention. A cross member 25 forming part of the drawbar frame structure 24 is disposed transversely of the tractor across the rear thereof and is equipped with a pluality of spaced openings 26 to which the mower frame is attached.

The mower of this invention is provided with a first yoke-like member 27 comprising a vertically disposed bearing member 28 and diverging arms 29 and 30. The yoke arms 29 and 30 each have outwardly projecting end portions 31 and 32 respectively. Further, each of these outward projections or feet portions is provided with apertures 33 and 34 which are spaced similarly to the spacing of the openings 26 in the cross member 25 on which the mower is to be mounted. The plurality of holes in the cross member 25 facilitates lateral adjustment of the mower thereon. The yoke member 27 is fastened to the cross frame member 25 by means of bolts inserted through the aligned apertures 33 and 26 and 34 and 26 as shown at 35 and 36 respectively.

A vertically disposed, generally stationary post or the like 37 is carried within the bearing supporting portion 28 of the yoke 27. Superposing the post or shaft 37 is a gear housing 38 which as best shown in FIGURE 3 is adapted to receive rotational drive from the tractor power take-off shaft 23 and deliver it to the mowing elements. Commencing with the power take-off shaft 23 emerging from the rearward end of the tractor 10, there is provided a pair of spaced apart universal joints 39 and 40 having a telescoping shaft means 41 therebetween. It is this articulate construction in the drive mechanism that permits operation even though the respective elements are somewhat misaligned and permits turning and other flexing of the mowing device relative to the tractor without interfering with drive from the tractor power takeoff shaft 23 to the mowing elements in a manner which will be subsequently described. A rearwardly projecting shaft 42 is joined to the second universal joint 40 and extends into the gear housing 38. Within the gear housing a bevel gear 43 is mounted on the end of the shaft 42 and engages with a bevel gear 44 disposed at right angles thereto. The bevel gear 44 is mounted on a shaft 45 which is journalled for rotation within the post or shaft 37. This construction is clearly shown in FIGURES 3 and 4.

The shaft 45 continues down through the post 37 and at the lower end thereof carries a bevel gear 46. The horizontally disposed bevel gear 46 is in meshing engagement with a bevel gear 47 disposed at right angles thereto. The vertically disposed bevel gear 47 is mounted on a shaft 48 which is journally supported in a second yoke-like member 49. A crank 50 is provided on the inner surface of the bevel gear 47 and is engaged by a pitman 51 which projects outwardly for engagement with an oscillating member 52. The member 52 is pivotally mounted at 53 on a frame member 54 of the mower. The member 52 is thus oscillated by means of the drive received from the tractor power take-off. The attachment of the pitman 51 to the oscillating member 52 is facilitated by a ball and socket joint 55 to permit the necessary flexibility required by reason of the oscillation.

The mower of this invention is provided with a cutting knife or bar 56 along the forward edge thereof and a cutting knife or bar 57 along the rearward edge thereof. Lateral extensions 58 and 59 of the cutter bars 56 and 57 respectively are provided for attaching the cutter bars to the oscillating member 52 at 60 and 61.

The second yoke-like member 49 is best shown in FIGURES 2, 3 and 4 and at its upper central portion has a vertically disposed sleeve 62 which snugly engages the post or shaft 37 in a journal mounting immediately beneath the sleeve-like portion 28 of the first yoke frame member 27. The yoke 49 is provided with a generally vertically disposed supporting member 63 which is joined at its upper end to the sleeve member 62 and at its lower end diverges into spaced apart forked arms 64 and 65. These diverging arms 64 and 65 are thence bent forwardly at right angles forming spaced apart parallel extensions 66 and 67. The ends of the parallel extensions 66 and 67 are thence each bent laterally outwardly forming axially aligned stub shafts 68 and 69. The common axis for the stub shafts 68 and 69 intersects the vertical axis through the post 37 to thus facilitate raising of the mower about these stub shafts as a hinge without interference with drive elements as will subsequently be described.

An H-shaped frame member 70 has substantially parallel side arms 71 and 72 which are journally carried on the stub shaft extensions 68 and 69 on the yoke member 49. The H-shaped frame member 70 further includes a cross member 73 thus giving the side frames 71 and 72 the necessary rigidity to support the load imposed by the outwardly extending mower frame 54 and its cutting knives on both the forward and rearward edges thereof. The journal mountings of the ends of the frame arms 71 and 72 onto the stub shafts 68 and 69 are indicated by the sleeve-like bearing members 74 and 75 respectively. The outer ends of the arms 71 and 72 are hingedly mounted at 76 and 77 on the mower frame member 54. These hinge mountings are shown best in FIGURE 2 wherein hinge pins 76a and 77a are in axial alignment thus permitting upward and downward swinging movement of the mower frame 54 thereabout. Similarly the axially aligned stub shafts 68 and 69 provide a pivoting axis for the raising and/or lowering of the mower and its unitary H-frame thereabout. The fact that the pivoting axis of the stub shafts 68 and 69 intersects the vertical axis of the post 37 permits the pitman drive to hinge without distortion.

As best shown in FIGURES 3 and 5, the vertical post or shaft 37 has a collar 78 mounted thereon which is bolted or otherwise fastened to the shaft 37 by means of diametrically opposed bolts 79 and 80. The collar 78 has outwardly extending strap-like end members 81 and 82 which have clamped thereto a fluid motor housing 83. The fastening of the fluid motor 83 to the collar flanges 81 and 82 is accomplished by means of bolt members 84 and 85.

The fluid motor 83 is shown in greatest detail in FIGURE 5 wherein there is disclosed a circular or cylindrical chamber 86 defined by the cylindrical wall 86a. The chamber 86 within the cylindrical wall is divided by a relatively fixed vane or rib-like member 87 which extends from one periphery to substantially the center of the chamber. Further a movable vane member 88 is affixed to a shaft member 89 and forms a substantial continuation of the fixed vane or rib member 87. The full lined position of the vane 88, as shown in FIGURE 5, indicates an intermediate position of that vane between its limit stops 90 and 91 located on the interior of the cylindrical housing 86a. The movable vane 88 is thus swingable from a position adjacent the stop 90 to a position adjacent the stop 91 merely by the admission or withdrawal of fluid from the divided portions of the chamber 86. Fluid under pressure is delivered to the fluid motor 83 either through the conduit 92 or the conduit 93. As shown in FIGURES 1 and 3, the conduit projects forwardly for attachment to the tractor wherein suitable pump and fluid reservoir means provides for the delivery of fluid under pressure through either of the conduits 92 and 93 and simultaneously the withdrawal of fluid through the one conduit not carrying the fluid under pressure to the fluid motor 83. Suppose, for example, fluid under pressure is admitted through the conduit 92. This will provide for the admission of fluid under pressure to a portion 94 of the chamber 86 on one side of the movable vane 88 causing that vane to move from its position adjacent the stop 90 to its position adjacent the stop 91. This, of course, necessitates the withdrawal of fluid from the fluid motor through the other conduit 93 back to the reservoir means on the tractor which has not been shown in detail inasmuch as it forms no specific part of the present invention. Conversely when fluid under pressure is admitted to the fluid motor through the conduit 93, the movable vane 88 is shifted from its position adjacent the stop 91 to a position adjacent the stop 90 and simultaneously fluid within the chamber portion 94 is discharged back to the reservoir through the conduit 92. To further define the fluid motor 83, the chamber 86 has a portion 95 of varying size on the side of the movable vane 88 opposite to the chamber portion 94.

Immediately beneath the fluid motor 83 is a mutilated spur gear 96 which is also fixedly mounted on the shaft 89 on which is carried the movable vane 88. Thus when the vane 88 is rotated within the cylindrical housing 86, there is a simultaneous rotation of the mutilated gear 96. The gear teeth of the mutilated gear 96 are in meshing engagement with a cooperative mutilated gear 97 which is formed integrally with the yoke member 49. As best shown in FIGURES 3 and 5 the gear 97 constitutes a lateral extension of the back supporting member 63 of this yoke 49. The center of the mutilated gear 97 about which the gear rotates is the post or shaft 37 on which the mower device is carried. Thus as fluid under pressure is delivered as desired to either of the chambers 94 or 95 within the fluid motor 83 and exhausted from the opposite chamber thereof, the movable vane 88 will rotate causing a simultaneous rotation of the shaft 89 and thus also the mutilated gear 96. By reason of the meshing engagement of the mutilated gear 96 with the mutilated gear 97 there is rotation of the gear 97 and thus also rotation of the yoke member 49 about the shaft 37 as a pivotal axis. The multilated gear 97 is merely journalled on the outside of the shaft or post 37. It should be apparent from the disclosures herein that the mower can be shifted 180 degrees from the full line position thereof in FIGURE 1 through the arc 98 to the dashed line position thereof in FIGURE 1 merely by the admission or withdrawal of fluid under pressure from either of the chambers 94 or 95 within the fluid motor 83. The invention herein also contemplates the upward swinging of the mower either about its outer hinge point on the axis 76—77 or its inner axis 68—69. It should be understood that suitable raising and/or lowering means can be provided for effecting movement about these hinges.

The mower itself, as previously stated, is equipped with cutting edges along the forward and rearward edges thereof. These cutting edges include a cutter element 56 along the forward edge and a cutter 57 along the rearward edge. The cutting element 56 on the forward edge is mounted in and guided by a cutter guard 99 consisting of a plurality of forwardly projecting fingers 100 and a recessed track 101 within which the knife element 56 may reciprocate. Similarly the knife element 57 along the rearward edge of the mower frame 54 has a cutter guard 102 consisting of a plurality of fingers 103 and a track 104 within which the cutter element 57 is free to reciprocate. The inner end of the frame 54 is equipped with a two-way ground engaging shoe or runner 105 while the outer end is provided with a similar ground engaging two-way shoe or runner 106. The shoe 105 is inclined upwardly at its forward end at 105a and inclined upwardly at its rearward end at 105b. Similarly the shoe 106 is inclined upwardly at its forward end at 107 and inclined upwardly at its rearward end at 107a. Thus regardless of the direction of travel of the mower the ground engaging shoes 105 and 106 will effectively act as runner or skid members on which the mower may slide along the ground or as indicated in FIGURE 1 around which the mower may swing on the ground from one side of the tractor to the other for effectively cutting in either direction.

In the operation of the mower of this invention, it should be understood that the provision of forward and rearward cutting edges makes for a more effective mower and cuts in either direction of movement of the mower whether the mower be a tractor mounted mower or a manually moved mower. In the device as shown, power is supplied from the tractor power take-off shaft 23 and thence through the gearing as previously described for effecting oscillation of the member 52 which in turn simultaneously reciprocates the cutting blades 56 and 57. Further it should be understood that as the blade 56 is moving outwardly, the blade 57 is moving inwardly and continuously changing so that regardless of the direction of movement of one blade, the other blade will be moving in an equal and opposite direction. This facilitates balancing of the mower and provides for a substantially quiet running mower and yet one which will effectively cut crop, grass or weeds or any grain as desired. Now when it is desired to effect a swinging of the mower from one side of the tractor to the other, fluid under pressure is admitted to the fluid motor 83 to thereby effect a rotation of the movable vane 88 with its integral shaft 89 to thereby actuate the cooperating multilated gears 96 and 97 to thus swing the mower to the side on which it is desired to operate the mower. This, of course, makes the use of the tractor mower more universal and provides for cutting of the highway shoulders in either direction and facilitates further the cutting of fields, adjacent fences or other obstacles with more versatility.

We are aware that numerous details of construction may be varied throughout a wide range without departing from the principles disclosed herein and we, therefore, do not propose limiting the patent granted hereon otherwise than as necessitated by the appended claims.

What is claimed is:

1. A mower having a relatively elongated frame structure, a first reciprocating knife element mounted for movement along the forward edge of said elongated frame structure, a second reciprocating knife element mounted for movement along the rearward edge of said elongated frame structure, a member pivotally mounted on one end of said elongated frame structure, means joining said knife elements to opposite ends of said pivotally mounted member, means oscillating said pivotally mounted member to thereby oppositely reciprocate the first knife element along the forward edge of said elongated frame member and said second knife element along the rearward edge of said elongated frame member.

2. A tractor mounted mower comprising a generally vertically disposed post member, a first yoke member supporting said post member and mounted on said tractor, a second yoke member journally mounted on said post member for rotatable movement thereabout, a frame member mounted on said second yoke member, a generally transversely disposed mower frame mounted on said frame member and extending outwardly therefrom, cutting means mounted along the forward and rearward edges of said transversely disposed mower frame, an oscillating member joining said cutting means to cause opposite reciprocation of said cutting means, drive means, said drive means including a shaft journaled for rotation within and carried down through said post member, gear means at the lower end of said shaft, a pitman driven by said gear means, said pitman extending outwardly from said gear means and attached to said oscillating member whereby the drive means effects reciprocation of the forward and rearward cutting means of the mower simultaneously.

3. A device as set forth in claim 2 in which means carried on said post member is provided to effect rotation of said second yoke member about said post member to provide for positioning of the mower on either side of the tractor.

4. A device as set forth in claim 3 in which said means for effecting rotation includes a fluid motor, and means joining said fluid motor for admitting fluid under pressure to said fluid motor to effect swinging movement of said mower.

5. A mower adapted to be carried on a support, said mower comprising a first yoke frame structure arranged and constructed for mounting on said support, said first yoke frame structure having a generally vertically disposed sleeve formed therein spaced from its attachment to said support, a vertical post mounted within said sleeve, a gear housing carried on top of said vertical post, a vertically disposed drive shaft journaled for rotation within said vertical post and extending up into said gear housing, means in said gear housing for imparting rotation to said vertically disposed drive shaft, a second yoke frame structure having a generally vertically disposed sleeve journaled on said vertical post, said second yoke frame structure having spaced apart arm members with outwardly extending projections together having an axis which passes perpendicularly through the vertical axis of said vertical post, a frame having one end thereof journaled on said outwardly extending projections, a mower frame pivotally mounted on the other end of said frame and extending generally transversely of said support, a reciprocating sickle carried on said transversely extending mower frame, a pitman, means driving one end of said pitman from the lower end of said vertically disposed drive shaft, and means joining the other end of said pitman to said reciprocating sickle.

6. A device as set forth in claim 5 in which said second yoke has a spur gear integral therewith and arranged for journal mounting over said vertical post, a second spur gear meshing with said spur gear, and means driving said second spur gear to effect a rotational movement of said second yoke about said vertical post.

7. A device as set forth in claim 5 in which said spur gear and said second spur gear are multilated.

8. A device as set forth in claim 6 in which said means driving said second spur gear includes a motor carried on said vertical post.

9. A device as set forth in claim 8 in which said motor is a fluid motor of the rotary type and includes a shaft, a movable vane therein mounted on said shaft, and said shaft directly joining said second spur gear.

10. A device as set forth in claim 5 in which there is included a second reciprocating sickle carried on said mower frame, said reciprocating sickle and said second reciprocating sickle mounted on the forward and rearward edges of said mower frame, said means joining the other end of the pitman to the reciprocating sickle including an oscillating member pivotally mounted on said mower frame and having oppositely extending end portions, said oscillating member having its oppositely extending end portions pivotally attached to said reciprocating sickle and said second reciprocating sickle, and said pitman pivotally joining said oscillating member at a position thereon spaced from its pivotal mounting to said mower frame whereby said sickles are simultaneously moved in opposite directions.

References Cited in the file of this patent

UNITED STATES PATENTS

| | | |
|---|---|---|
| 33,943 | Hopkins | Dec. 17, 1861 |
| 273,705 | Berrigan | Mar. 13, 1883 |
| 1,503,732 | Walling | Aug. 5, 1924 |
| 2,790,295 | Collins | Apr. 30, 1957 |
| 2,796,720 | Carlson | June 25, 1957 |
| 2,827,750 | Pool et al. | Mar. 25, 1958 |